April 29, 1958 R. C. CLARK ET AL 2,832,369
ROTARY PISTON VALVE
Filed April 29, 1955 2 Sheets-Sheet 1
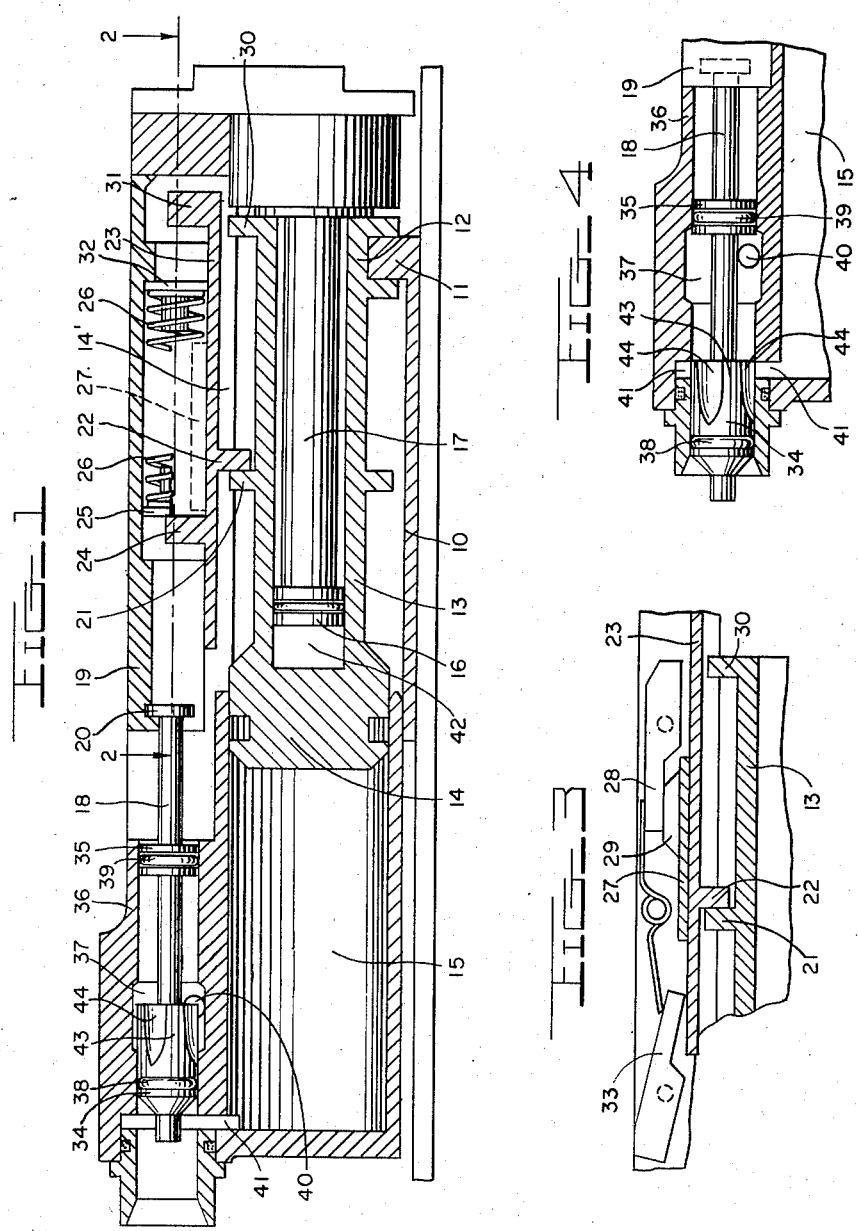
INVENTORS
ROBERT C. CLARK
WILLIAM G. LAYNE
BY *W. R. Maltby*
*Howard White* ATTORNEYS

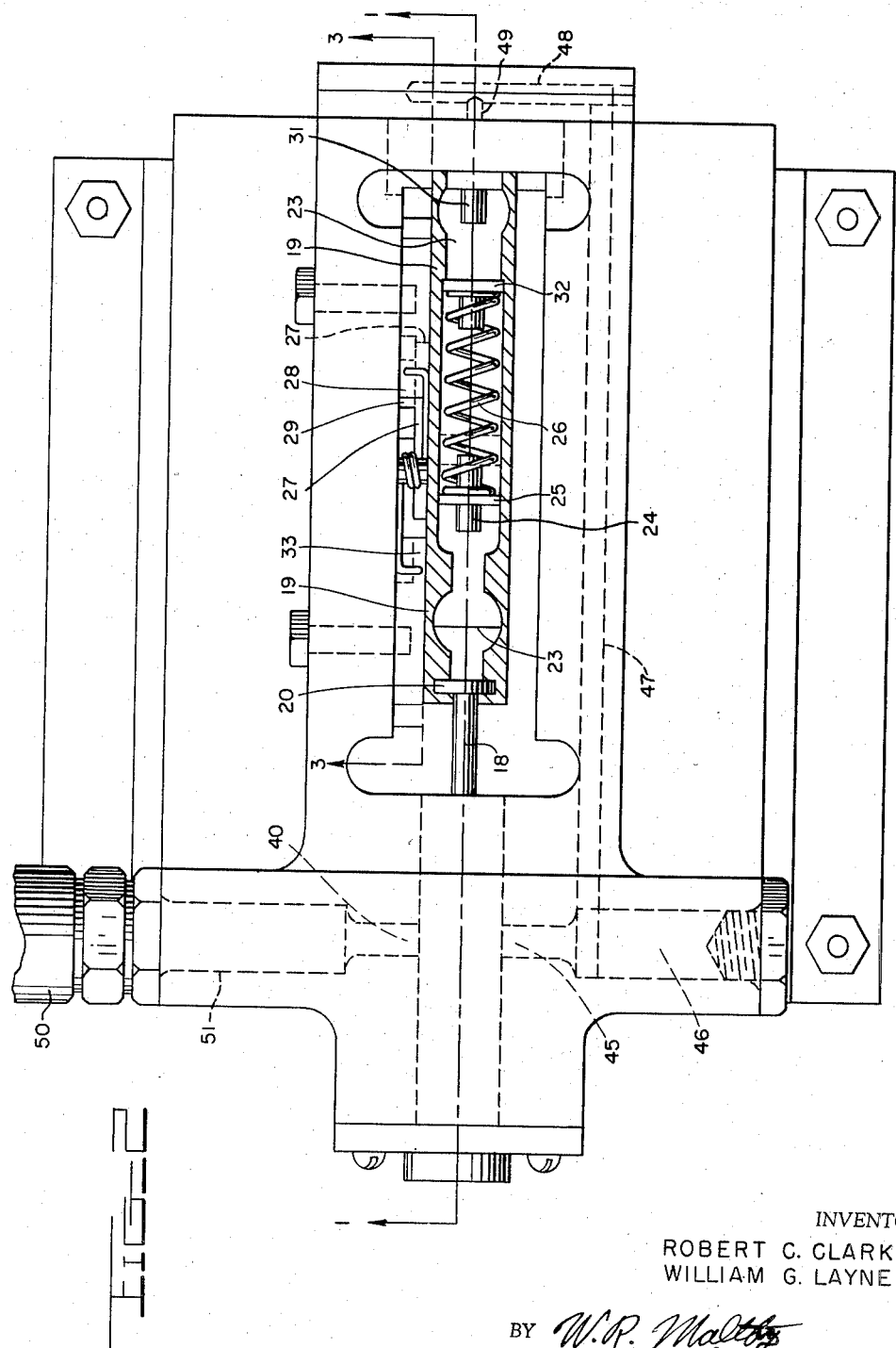

United States Patent Office 2,832,369
Patented Apr. 29, 1958

2,832,369

ROTARY PISTON VALVE

Robert C. Clark, Alexandria, Va., and William G. Layne, Oxon Hill, Md., assignors to the United States of America as represented by the Secretary of the Navy Application April 29, 1955, Serial No. 505,070

2 Claims. (Cl. 137—332)

(Granted under Title 35, U. S. Code (1952), sec. 266)

The invention described herein may be manufactured and used by or for the Government of the United States of America for governmental purposes without the payment of any royalties thereon or therefor.

The present invention relates in general to valve structures and more particularly to a balanced piston valve of the type having a pair of piston heads spaced along a common valve shaft to define the end walls of a cylindrical pressure chamber for controlling communication of the chamber with a working cylinder-and-piston combination.

An object of the invention is the provision of a balanced piston valve structure with simple combined guiding and rotating means for the piston heads to prevent cocking of the valve in passing a valve port and insure uniformity of wear.

A further object is the provision of a guiding and rotating means situated wholly within the pressure chamber between the piston heads whereby to obtain the above features without substantial increase in overall dimensions and with minimum increase in weight, which latter is of particular advantage in aircraft equipment.

An ancillary object is the provision of rotating means, as mentioned above, operated by the flow of working fluid through the valve casing.

Various other objects and advantages of the invention will become apparent upon perusual of the following specification and the drawings accompanying the same.

In the drawings:

Fig. 1 is a vertical longitudinal section on line 1—1 of Fig. 2 with certain solid cylindrical portions remaining unsectioned.

Fig. 2 is a plan view with the spring housing shown in section on line 2—2 of Fig. 1.

Fig. 3 is a fragmentary sectional view taken on the line 3—3 of Fig. 2.

Fig. 4 is a fragmentary sectional view showing the valve in its extreme left hand positions.

While the invention is concerned with the valve structure per se, a portion of mechanism to be controlled thereby will be shown and described herein for the sake of fullness of disclosure. To this end the invention is here shown as applied to the control of a pneumatically actuated reciprocating element operable in its reciprocation to effect the actuation of a gun, ammunition loading mechanism not shown.

Here the reciprocating element to be operated indicated at 10, has reciprocating motion imparted thereto through the lug 11 carried by the element 10 and engaged by a driving fork 12 on the large, outer, hollow, piston rod 13 of relatively large piston 14. The large piston operates in the large work cylinder 15, while the interior of the large hollow piston rod 13 forms a work cylinder for a relatively small stationary piston 16 carried at the end of a small, hollow stationary piston rod 17.

Compressed air, in the present instance at a pressure of about 500 pounds per square inch, supplied through this small hollow stationary piston rod 17 to the interior of the large piston rod 13 tends to move the latter and its large piston 14 into the large work cylinder 15 while compressed air admitted into the work cylinder 15 at the same pressure operates to move the large piston 14 toward the right due to the difference in area of the two pistons. It will be understood that the space 14' back of or to the right of piston 14 is open to atmosphere. It is to the control of the supply and release of pressure fluid to and from the work cylinder 15 of such a loading mechanism that the present novel valve structure is applied. Reciprocatory movement of the piston 14 is imparted to the valve stem 18 of the controlling piston valve, to be presently described, through a snap-action device in the form of a spring housing 19 coupled to the valve stem through a swivel head 20 to permit free rotation of the stem. Snap action is obtained in the movement of the spring housing 19 to the right by engagement of lug 21, on the large piston rod 13, with lug 22 on a sliding spring compressor 23. A lug 24 carried on the spring compressor engages the spring block 25 to compress the spring 26 against the right hand end of the spring housing through spring block 32, tending to urge the spring housing to the extreme right hand position shown in Fig. 1. However, during compression of the spring, the housing is blocked against movement by a detent 27 (Figs. 2 and 3) carried by the spring housing and engaging a sear pawl 28 which up to this time has been resiliently held down in the path of the detent as is the pawl 33 (Fig. 3). Continued movement of a cam 29 carried by the compressor 23 raises the pawl 28 to the position shown in Fig. 3, to free the detent, whereupon under urge of the compressed spring, housing 19 is snapped or quickly moved into the position shown in Fig. 1, carrying with it the valve stem 18 into the position shown in Fig. 1.

Similarly, each time the large piston rod 13 moves to the left, the lug 30 takes up the space between it and the lug 22 and engages the latter to move the spring compressor 23 to the left. The lug 31 carried by the spring compressor engaging the right hand spring block 32 compresses the spring, storing energy therein to urge the spring housing to the left. However, during compression of the spring the spring housing is blocked against movement by the detent 27 (Figs. 2 and 3) engaging sear pawl 33 until continued movement of the cam 29, carried by the compressor element 23, sliding under the pawl, raises the pawl to free the detent 27, whereupon under urge of the compressed spring, the spring housing 19 is snapped or suddenly moved to the left to move the valve stem and pistons into the extreme left position shown in Fig. 4.

Referring now to the valve structure, this is of the piston type and comprises a pair of piston heads 34 and 35 carried by the valve stem 18 for sliding and rotary motion within a cylindrical valve casing 36, the piston heads and casing being fitted in cylinder-piston relation, with the valve stem of lesser diameter than the interior of the casing, and the piston heads spaced axially along the valve stem within the casing to form a pressure chamber 37 between the piston heads. The piston heads 34—35 are provided with suitable O rings 38—39, respectively, which act as piston rings for sealing the pistons. Working fluid under pressure such as compressed air is supplied to the pressure chamber 37 by way of a constantly open inlet port 40 in the valve casing 36, which port remains uncovered by either piston, both in the extreme right hand position of the pistons as shown in Fig. 1 or the extreme left hand position as shown in Fig. 4. Comparing Figs. 1 and 4 it will be noted that when in the right hand position as in Fig. 1 the piston head closes off the outlet port 41 from the interior of the pressure chamber 37 and opens the work cylinder 15 to atmosphere through the port 41, while when in the left hand position of Fig. 4 the piston head 34 shuts off the outlet port 41 from atmosphere and opens it to the pressure chamber 37 to permit compressed air to pass through the valve into the work cylinder 15 by way of piston grooves 44. These grooves are tapered in cross-sectional area toward the end first reaching the outlet port 41 so as to avoid a too abrupt opening of the port with its tendency to blow out the O ring packing.

It has been found that in conventional piston valves, the wear between piston heads and valve casing walls is uneven, and that there is a tendency for the piston assembly to cock or get out of line in passing over a valve port such as the outlet port 41 which as shown in Figs. 1 and 4 extends around the cylindrical wall of the casing and occupies a substantial area of the bearing surface of the cylindrical wall. To avoid or reduce to a minimum this tendency to cocking or misalignment of the pistons due to lack of adequate bearing surface in passing over the port opening, a portion of the piston head 34 is extended from its seating ring portion into the cylindrical casing a substantial distance toward the other piston head 35, in the form of a plurality of fins 43 each extending radially from the valve stem 18 to the cylinder wall to engage the latter in sliding contact and to provide aligning ribs extending axially of the cylinder and intercepting the path of pressure fluid entering from the inlet port 40 in a direction transverse to, and to one side of the axis of the valve stem. In the present embodiment of the invention these ribs or fins are formed by the metal remaining between the grooves or channels 44.

A constantly open outlet port 45 (Fig. 2), is provided in the valve casing not diametrically opposite the inlet port 40 but opposite and in line with port 40 to one side of the axis of the valve stem so as to aid in directing the path of flow of pressure fluid into and across the pressure chamber to one side of the valve stem. The outlet port 45 communicates with the interior of the small hollow piston 17 through a channel formed by cross borings 46, 47, 48 and 49 in the body material of the frame work of the loading device in which the present valve structure is used.

In operation, compressed air from any known or other suitable source, not shown, is supplied through supply hose 50 (Fig. 2), channel 51 and inlet port 40 to the pressure chamber 37 (Fig. 1) and thence out via the continuously open outlet port 45 (Fig. 2), and channel passages 46, 47, 48 and 49 through small hollow piston 17 (Fig. 1) to the interior cylindrical chamber 42 of the large hollow piston rod 13 forcing the large piston 14 into the work cylinder 15, the latter exhausting through the port 41. As the piston 14 and piston rod 13 move away from the smaller stationary piston 16 the working fluid passing into the chamber 42 through the valve pressure chamber 37 is intercepted in its passage across the chamber to one side of the valve stem by the radial fins 43 imparting through the latter to the valve stem a torsional moment resulting in rotation of the piston heads and fins. Continued movement of the large piston rod 13 to the left stores up energy in the storage compression spring 26 until near the end of its stroke whereupon the piston valve is snapped over to the extreme left hand position shown in Fig. 4. This positioning of the valve pistons shuts off the outlet port 41 from atmosphere and opens it to the pressure chamber 37 through the grooves 44 in the piston head 34 while maintaining a substantial portion of the peripheral surface of the piston extension in close fitting sliding engagement with the cylindrical wall of the valve casing to maintain alignment as the sealing portion of the piston passes over the annular outlet port 41. The pressure fluid now passing into the larger work cylinder 15 still entering the pressure chamber 37 off center and to one side of the piston stem 18, assumes a whirling motion on its way to the grooves between the fins 43 and imparts to the latter a torsional moment tending to effect rotation of the pistons. Thus, due to the combined guiding and turbine-blade action of the fins 43, the movable piston assembly is provided with longitudinally extended guiding surfaces within the cylinder to avoid cocking and reduce wear, and both the guiding surfaces and pistons are rotated to assure uniformity of wear.

While but one embodiment of the invention has been herein described in detail for the sake of disclosure, it is to be understood that the invention is not limited to such specific embodiment but contemplates all such modifications and variants thereof as fall fairly within the scope of the appended claims.

What is claimed is:

1. A balanced piston valve structure comprising a cylindrical valve casing having an inlet and an outlet port, a valve stem having a pair of spaced piston heads fixed thereon and fitted in piston-cylinder relation with the casing for sliding and rotational movement in the casing with the inlet port between them, said valve stem being of lesser diameter than the interior of the casing to provide a pressure chamber around the stem between the piston heads into which the inlet port enters, said inlet port being positioned to direct pressure fluid into the chamber in a path transverse to and to one side of the axis of the casing, one of said piston heads being arranged to open and close the outlet port to the pressure chamber in the sliding movement of the piston assembly, said one piston head extending into the cylindrical valve casing and provided with a plurality of grooves extending axially from the pressure chamber end of the piston for only a portion of the piston length, forming a plurality of channels separated by fins extending along the grooved portion of the piston head in sliding contact with the cylindrical casing to act as guides for maintaining alignment of the piston head assembly, said fins extending into the path of pressure fluid passing into the pressure chamber to impart a rotary motion to the valve stem and pistons.

2. A balanced piston valve structure comprising a cylindrical valve casing having inlet and outlet ports, a valve stem having a pair of spaced pistons fixed thereon and fitted to the cylindrical casing, said stem and pistons being slidable and rotatable in said casing, said stem being substantially smaller in diameter than the interior of the casing to provide a pressure chamber between the wall of the casing and the spaced piston heads, said outlet port being positioned in the path of one of said pistons and said inlet port being arranged to direct fluid under pressure into the pressure chamber transversely of and to one side of the axis of the casing and valve stem and a plurality of fins, at least three in number, carried by the stem between the piston heads, projecting radially of the stem into the path of fluid injected through the inlet port for imparting rotary motion to the shaft, said fins being distributed substantially uniformly about the shaft and forming circumferentially spaced axial extensions of the piston surface in sliding contact with an inner cylindrical wall of the casing for an axial distance greater than the axial length of the outlet port to act as centering guides to maintain the pistons coaxial with the casing during passage of said one piston over said outlet port.

References Cited in the file of this patent

UNITED STATES PATENTS

| 1,180,000 | Bloom | Apr. 18, 1916 |
| 1,969,954 | Taylor | Aug. 14, 1934 |
| 2,713,989 | Bryant | July 26, 1955 |
| 2,791,229 | Pasco | May 7, 1957 |